US008839453B2

(12) United States Patent
Sanjeev (10) Patent No.: US 8,839,453 B2
(45) Date of Patent: Sep. 16, 2014

(54) AUTHENTICATING A MOBILE DEVICE BASED ON GEOLOCATION AND USER CREDENTIAL

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 486 days.

(21) Appl. No.: 12/758,412

(22) Filed: Apr. 12, 2010

(65) Prior Publication Data

US 2011/0252464 A1    Oct. 13, 2011

(51) Int. Cl.
     *G06F 21/10*      (2013.01)
(52) U.S. Cl.
     USPC ............... 726/27; 726/28; 726/29; 713/182; 713/183; 713/184
(58) Field of Classification Search
     USPC ............... 726/27, 28, 29; 713/182, 183, 184
     See application file for complete search history.

(56) References Cited

U.S. PATENT DOCUMENTS

| | | | | |
|---|---|---|---|---|
| 8,166,530 | B2 * | 4/2012 | Adams et al. | 726/9 |
| 8,248,237 | B2 * | 8/2012 | Fitzgerald et al. | 340/571 |
| 8,350,666 | B2 * | 1/2013 | Kore | 340/5.2 |
| 8,521,123 | B2 * | 8/2013 | Cook et al. | 455/404.1 |
| 2002/0137524 | A1 * | 9/2002 | Bade et al. | 455/456 |
| 2003/0073448 | A1 | 4/2003 | Ozeki et al. | |
| 2005/0164675 | A1 * | 7/2005 | Tuulos et al. | 455/410 |
| 2006/0128419 | A1 * | 6/2006 | Shimizu et al. | 455/550.1 |
| 2007/0130279 | A1 * | 6/2007 | Thacher | 709/208 |
| 2010/0317336 | A1 * | 12/2010 | Ferren et al. | 455/419 |
| 2011/0055891 | A1 * | 3/2011 | Rice | 726/2 |
| 2011/0141276 | A1 * | 6/2011 | Borghei | 348/143 |

OTHER PUBLICATIONS

Extended European Search Report issued in European Patent Application No. EP 11003083.0 dated Jul. 15, 2011.

* cited by examiner

*Primary Examiner* — Christopher Brown (57) ABSTRACT

Mobile devices provide security based on geographic location. With such a technique, a mobile device may automatically check its current location against geographic information as to the location(s) in which it is permitted to operate. When the user attempts access to the device, the mobile device will prompt the user for his/her credential only if the geographic location matches an allowed location. The user gains access then by inputting information corresponding to the credential, e.g. username and password, of a valid user. In the examples, if the geographic location does not match an allowed location, the mobile device provides a warning to the user, and the user is not allowed to enter any credential information. Optionally, the mobile device may send an alert message about the device being taken outside a specified boundary, e.g. to report the situation to other personnel.

11 Claims, 3 Drawing Sheets

AUTHENTICATING A MOBILE DEVICE BASED ON GEOLOCATION AND USER CREDENTIAL

TECHNICAL FIELD

The present subject matter relates to techniques and equipment to control user access to operate a mobile device, based on a combination of geographic location and user's credential.

BACKGROUND

In recent years, wireless communication network technologies and development of small easily portable mobile devices for operation via such networks has allowed users to be accessible for communication while actively moving about, in buildings, around campuses and even across large geographic areas. Common examples of mobile devices include mobile telephone stations or smart phones as well as various portable computer devices having wireless connectivity (e.g. netbooks or laptops). However, there are situations where it may be desirable to restrict use of a mobile device, to certain users and based on area of operation.

For example, an enterprise having a number of mobile devices may, for security and/or business reasons, want only its personnel (e.g. employees or members) to use the enterprise's mobile stations and only within its premises (e.g. building(s) or campus(es)). Parents may want children to be able to operate their mobile devices at certain places, e.g. home or public areas, but not other places, e.g. at school. There are a variety of ways to restrict use to authorized persons, by imposing varying degrees of strict username and password type requirements. However, such credential-based approaches do not guarantee location based security.

Consider the enterprise scenario by way of a more specific example. Many enterprises requiring security will have secure networks on their premises. The mobile devices interact with network elements to authenticate the devices. Devices not recognized as authentic are denied access. This prevents outside devices from entering and accessing the network. However, this does not stop a user with an authentic device from taking the device outside the enterprise premises and using it, including sometimes for communication via a broader area network. For example, a device having cellular network or WiFi capabilities may be able to operate through a public network. In particular, some WiFi networks may have low security or may be accessible to anyone for an agreement to pay a fee (e.g. via credit card).

The enterprise may have a guideline under which its personnel (users like employees or members) have guidelines prohibiting the users from taking the devices outside the premises. However, there is no way to enforce this. Traditionally, the enterprise could only rely on their personnel to use any enterprise mobile device as per the guideline. If the device and/or the user had the capability to access a network outside the premises, then sometimes, an employee could take the mobile device home or to a public place. The device is outside the secure premises and may be lost, stolen or compromised by its communications over the more public network. Confidentiality of data on the device may be compromised.

SUMMARY

The teachings herein alleviate one or more of the above noted problems with maintaining security of mobile devices that are intended for use only within a limited location or area(s), by adding a device authentication layer that is based on geographic location of the mobile device.

The detailed description therefore encompasses a method of authenticating a user to operate a mobile device. In this method, the mobile device determines its geographic location. The method entails comparing the determined geographic location to information defining one or more locations of permitted operation of the mobile device, stored in the mobile device, to determine whether or not the mobile device is at a location of permitted operation. Only upon determining that the mobile device is at a location of permitted operation, will the mobile device generate a prompt to the user to enter credential information into the mobile device. The mobile device can then receive an input of credential information from the user; and the device will permit user access to operate the mobile device only upon a match of the input credential information to credential information of a valid user, stored in the mobile device.

For example, an enterprise mobile device may automatically check its current location from time to time against geographic information as to the location(s) in which the enterprise intends to permit operation of the device. The mobile device will prompt a user for his/her credential only when the geographic location matches with an allowed location. The user gains access then by inputting information corresponding to the credential of an authorized user, e.g. an appropriate username and password. However, if the geographic location does not match with an allowed location, then the mobile device provides a warning to the user about location restriction. The user is not allowed to enter any credential information. The mobile device may interrupt any operations the user started prior to the determination that the device is outside of the area(s) of permitted operation. Optionally, the mobile device may send an alert message about the device being taken outside a specified boundary, e.g. to report the situation to security or information technology personnel of the enterprise. The configuration of the device for such location based access/operational control is programmed into the device, for example, by over-the-air communication via a wireless network. The configuration may be changed dynamically, with changes in permitted locations of operation by the enterprise and/or to permit a temporary override upon request from the user and approval by the enterprise.

The disclosure herein also encompasses an appropriately configured mobile device as well as programming as might be used to configure a mobile device to implement user authentication and operational control of the type outlined above. A software or program product, in accord with such a concept, might include at least one machine-readable medium and programming carried by the medium for implementing the user authentication based on geographic location and user credential.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various techniques, mobile devices and/or programming for mobile devices enable control of operation of the mobile devices by adding a device authentication layer that is based on geographic location of the mobile device. With such a technique, a mobile device may automatically check its current location against geographic information as to the location(s) in which it is permitted to operate. When the user attempts access to the device, the mobile device will prompt user for his/her credential only if the geographic location matches with an allowed location. The user gains access then by inputting information corresponding to the credential of an authorized user, e.g. an appropriate username and password. However, if the geographic location does not match with an allowed location, then the mobile device provides a warning to the user about location restriction. The user is not allowed to enter any credential information. Optionally, the mobile device may send an alert message about the device being out taken outside specified boundary, e.g. to report the situation to security or information technology personnel of an enterprise whose personnel are intended to use such mobile devices.

Figure 1:
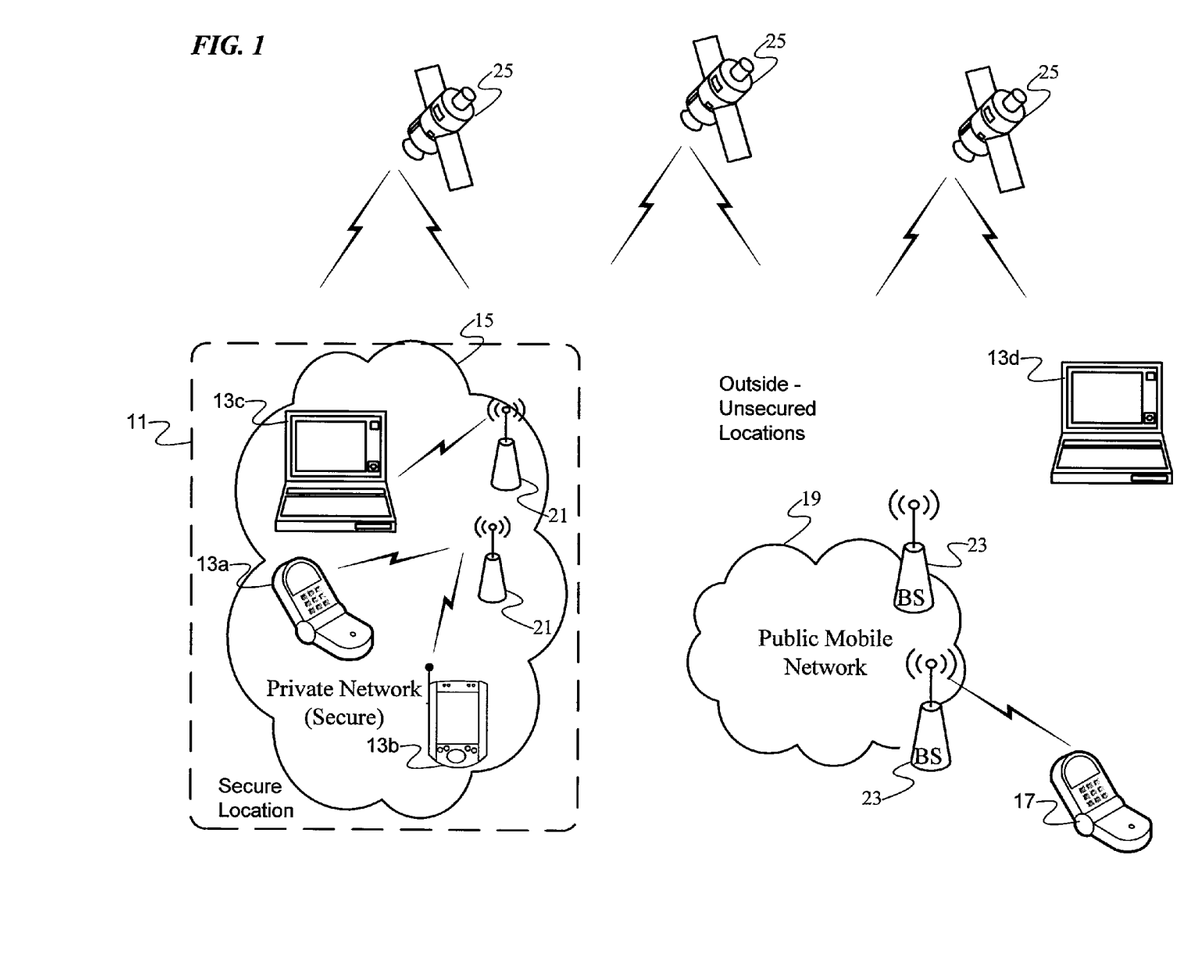
FIG. 1 is a high-level functional block diagram of an example of systems including wireless mobile communication networks, in which mobile devices of an enterprise may implement authentication based on geographic location and user credentials.

Reference now is made in detail to the examples illustrated in the accompanying drawings and discussed below. FIG. 1 is a high-level functional block diagram of an example of systems in which the geographic location based authentication may be used. Those skilled in the art will be familiar with the devices and systems, in general, and the elements shown in FIG. 1 will be discussed only briefly here to provide some exemplary context for the later discussion of examples of operations involved in geographic location based authentication.

In the drawing, the location 11 is deemed secure from the perspective of an exemplary enterprise, in that the enterprise designates that location as one where its personnel may use the mobile devices 13 of the enterprise. Four examples 13a-13d of various types of mobile devices are shown in the drawings. Three mobile devices (13a-13c) are within the secure location 11, and one mobile device 13d is outside the secure location 10. The enterprise may operate and provide to its employees or members any of a variety of different types of mobile devices, and more such devices are entering the market as device manufacturers and network service providers continue to develop and market ever more new product. For purposes of illustrating an example, the drawing shows three types of enterprise mobile devices. The drawing shows the enterprise mobile device 13a as a portable handset type mobile station. Although it may use different network communications technologies, the device 13a has a form factor like any of the commonly available cell phones. The exemplary device 13b is a smart-phone or a personal digital assistant (PDA) or the like. In our example, the other mobile devices 13c and 13d are portable computing devices, such as a netbook computer or a laptop type personal computer (PC), which in the example at least, incorporate a mobile communication transceiver. All of the enterprise mobile devices 13 include elements/programming to enable location determination.

Within the secure location 11, the enterprise may operate a communication network 15. The network 15 is secure and not readily accessible by mobile devices such as 17 that our intended for use in a public network 19 outside the secure location 11. However, the network 15 may offer wireless communications within the premises, for example, via WiFi access points such as the two shown at 21. The access points or base stations 21 in the network 15 and the wireless transceivers of the enterprise mobile devices 13 could use communications technologies the same as or similar to (compatible with) public network communications, either public WiFi hotspots or public cellular communications networks. The enterprise network 15 will include various other routing and service control elements represented generally by the cloud in the diagram. The network 15 may offer communications to other parties/equipment outside the premises and even outside the enterprise. However, the enterprise will have policies and security in place to protect the enterprise equipment and data and to limit enterprise users' communications in a manner deemed appropriate by the enterprise.

The public network 19 provides wireless communications services to any number of users' mobile devices, although only one device 17 is shown for convenience. The network 19 will include a number of base stations (BSs) 23 for the actual over-the-air wireless communications as well as various other routing and service control elements represented generally the cloud in the diagram. As noted, the technologies of the public network 19 may be compatible with the enterprise mobile devices 13, so that a device 13 might be able to access the network 19 when outside the secure location 11. For example, if the network 19 offers a WiFi hotspot to the public, and the enterprise mobile device 13d has a WiFi interface, then the user of the device 13d could operate the device via the unsecure public network 19, unless there is some other form of security in place. Even if network access is unavailable, e.g. if the network 19 is a cellular network and the user of the device 13d does not have a cellular network subscription and interface card, the enterprise may still prefer that the user of that device not be able to operate the device in any manner or have access to data stored in the device, when that device is outside the enterprise's secure location 11.

Many modern mobile devices have the capability of determining their locations. The location portion of the authentication process under consideration here can utilize a variety of different techniques for each of the enterprise mobile devices 13 to determine its location for implementing the enterprise location of use policy. Exemplary techniques include standalone global positioning satellite (GPS) location determination, assisted GPS (aGPS) location determination, and triangulation using a signal from any one or more receivable base stations of one or both of the networks 15, 19. The easiest approach to explain and implement might be for each mobile station 13 to have full on-board GPS and GIS (Geographic Information System) capabilities, to measure satellite signals, determine position and compare that to permitted locations of use, such as the geographic area of secure location 11 in our example. The GPS system includes a constellation of orbiting satellites, three of which are shown at 25 in the drawing. The satellites 25 broadcast signals that can be detected and measured, and by combining measurements of signals from three or more of the satellites, a mobile device 13 can determine its latitude and longitude.

Hence, in the example, of FIG. 1, the mobile devices 13 can process GPS satellite signals to determine their current locations. If the satellite signals are not available, the devices may use one or more of the other known techniques to determine location. If they can not determine location, they may be configured to assume that they are outside of the permitted location of operation, that is to say outside the secure location 11 in our example, and block user authentication and access. The devices 13a to 13c will determine locations and compare locations to geographic coordinates for the secure location and determine that they are within the boundaries of the permitted location of operation. When the user attempts authentication to gain access and use such a device, the device will prompt the user for credential information, such as username and password. Then, if the user enters a user name and password that matches an authorized or valid user's credential for the particular device, then the device will permit access and use or operation of the device features and access to any data stored in the device. Of course, if the user does not enter a user name and password that matches an authorized user's credential for the particular device, then the device will block access in a manner similar to existing credential based security procedures.

In our example, however, the device 13d is outside of the secure location 11. Hence, when that device 13d processes GPS satellite signals to determine its current location, it compares the resulting coordinates to geographic coordinates for the secure location and determines that it is not within the boundaries of the permitted location 11 of operation. Under those circumstances, the device 13d will not even offer the user a prompt for entry of the user's credentials. Depending on the level of security desired by the particular enterprise, the device may cut the user out as soon as it detects leaving the secure location 11, interrupting operation even if the user is currently operating the device based on a prior successful authentication. Of course, operational access upon user authentication might be restored when the device 13d is returned to a location like 11 where the enterprise intends to permit device operation.

For example, a hi-tech company may be developing a next generation device and for business reasons does not want technical or commercial information about the product leaked to competitors, media or consumers. The company might establish a policy based on geographic location, whereby its employees are not to take any of the enterprises mobile devices 13 that may contain data about the product outside of the secure location 11 where they are working on the project. To enforce the policy, the mobile devices 13 would be configured to implement a geographic location based authentication, in which the device will lock the user out (prevent authentication/access) if taken outside the predefined area of permitted operation. Also, the device might automatically alert or notify the company when and who is trying to get a mobile device 13 out of the secure company premises.

Figure 2:
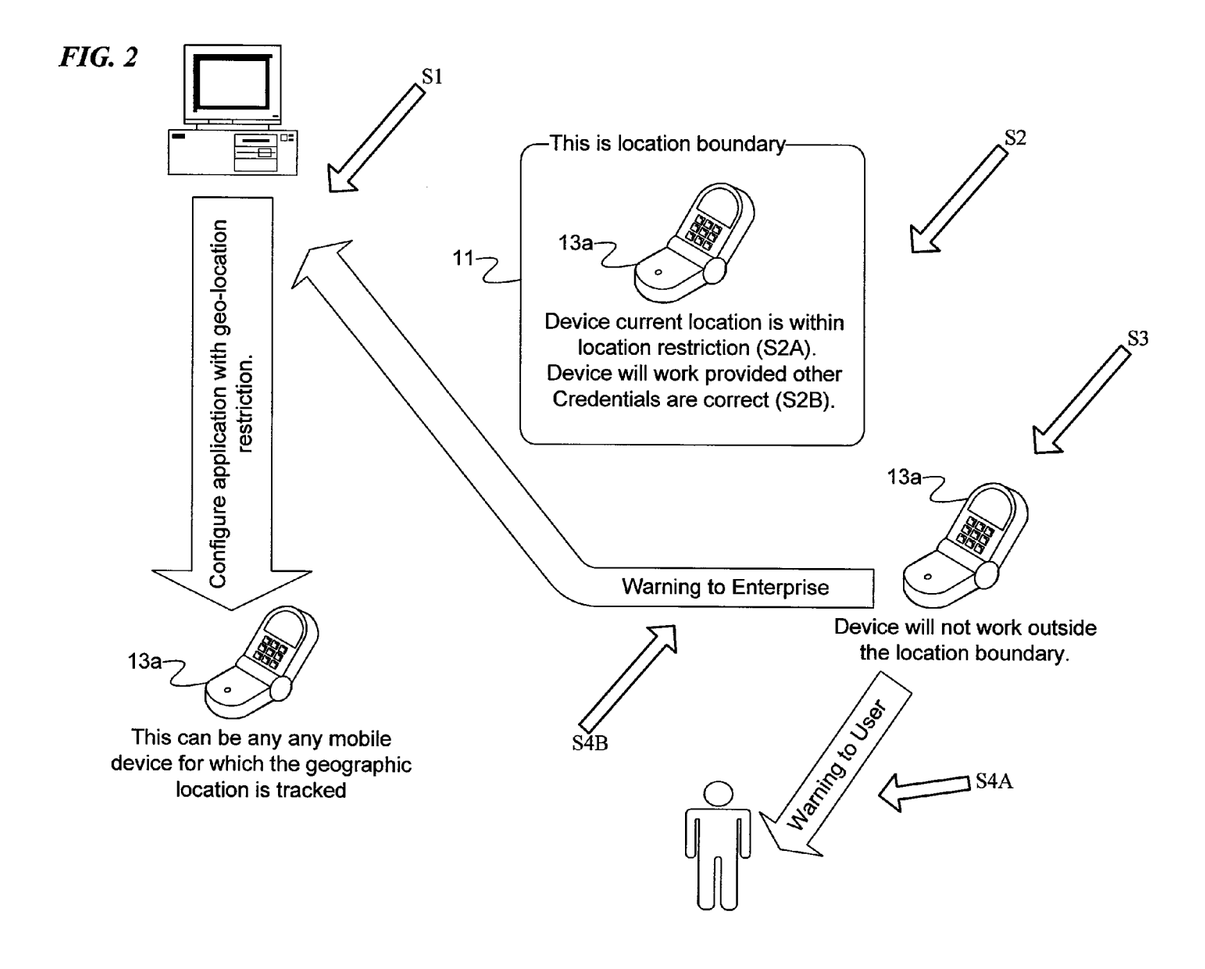
FIG. 2 represents an example of a process flow as might be used to implement authentication of a mobile device of an enterprise, based on geographic location and user credentials.

FIG. 2 illustrates steps of a process flow as might be used to implement authentication of a mobile device of an enterprise, based on a combination of geographic location and user credentials. For purposes of this process example, we will assume that the particular device is device 13a shown as a mobile station device in FIG. 1, although obviously similar procedures would apply to the other mobile devices of the enterprise.

In step S1, the enterprise configures an authentication application in each mobile device with a geographic location restriction. This may involve installing or updating the authentication application to add the geographic layer. This also entails storing coordinate information for the location(s) where the user will be permitted to use the particular device 13. This step can be done over the air, and as a result, the enterprise may change the permitted location(s) dynamically over time, e.g. as user assignments and thus deployments of the devices change over time. The geographic location information may establish a profile with different day/time when the device can have a different geo-location restriction.

Once, the device 13a is fully configured, including the authentication configuration of step S1, the user may begin operating and using the device. At least when the user attempts to authenticate herself/himself, and possibly on some periodic basis, the mobile device 13a will determine its geographic location, based on GPS measurements or other available means, as outlined earlier. The mobile device 13a then compares its current location to the information as to permitted location(s) of operation of the device. At S2, the device 13a is within the location boundary of a location like 11 where the user profile indicates that the user is permitted to have and operate the mobile device 13a. Hence, in the example, the mobile device 13a determines that its current location is within location restriction for the permitted location 11 (S2A). Then, the mobile device will work provided other credentials are correct, for example, that the user has previously or in response to a prompt now enters user name and password data that matches an authentication credential for a valid user of the mobile device 13a (S2B).

However, now assume that at S3 the user has taken the mobile device 13a outside of the location 11 within which the enterprise allows the user to have and operate the device 13a (S3). Now the mobile device 13a processes GPS satellite signals to determine its current location, it compares the resulting coordinates to geographic coordinates for the secure location and determines that it is not within the boundaries of the permitted location of operation 11. The device 13a will not even offer the user a prompt for entry of the user's credentials and may interrupt any pre-existing work session or other operation of the device by the user. Instead of permitting the user to access and operate the device, the mobile device 13a provides a warning to the user about location restriction (S4A). The warning may be audible, visual or a combination thereof. The user is not allowed to enter any credential information. Optionally, the mobile device 13a may send an alert message (S4B) about the device being taken outside the specified boundary, e.g. to report the situation to security or information technology personnel of the enterprise. The alert message may indicate the situation and provide the enterprise with the geographic location of the device 13a to facilitate possible recovery.

Although not shown as a separate step, it may be possible for the user to communicate with appropriate enterprise personnel to obtain a waiver or override of the location based authentication restriction. If available, the enterprise would communicate over the air with the device 13a to reconfigure the authentication profile, e.g. to provide coordinates for a different location of permitted operation or to temporarily disable the location-based layer of the authentication application in the mobile device 13a.

As outlined earlier, the location based authentication may be implemented in any type of mobile device. In many cases, the implementation involves appropriate programming of the device and storage of a user profile in the device, where the profile includes permitted location of operation information, username, password and possibly a schedule of times/locations of permitted operation. Those skilled in the art presumably are familiar with the structure, programming and operations of various mobile devices. However, for completeness, it may be useful to consider the functional elements/aspects of a couple of examples, at a high-level.

Figures 3, 4:
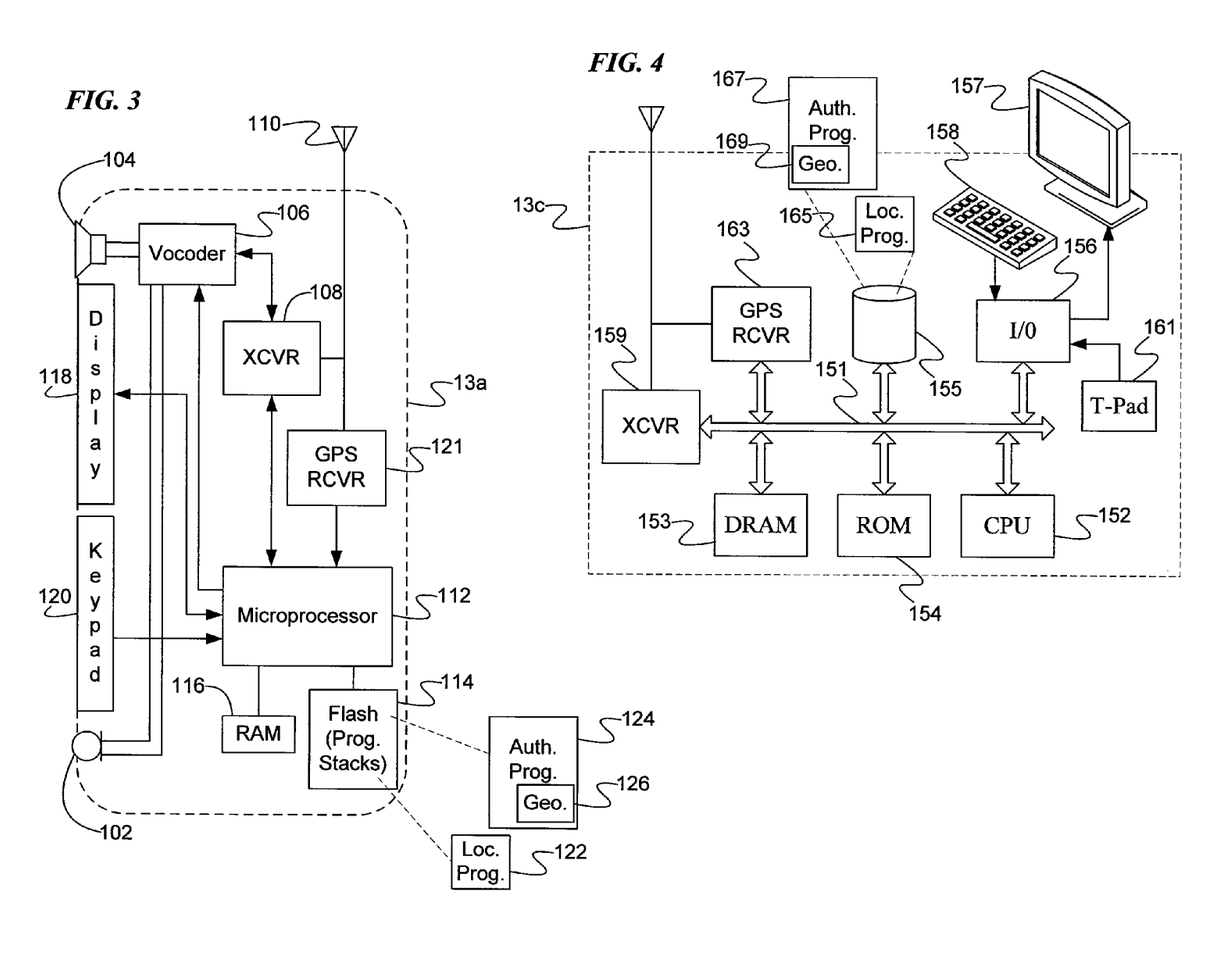
FIG. 3 is a high-level functional block diagram of an example of a mobile device in the form of a mobile telephone station or smart phone.
FIG. 4 is a high-level functional block diagram of an example of a mobile device in the form of a portable computer device, such as a netbook or laptop personal computer (PC).

For purposes of such a discussion, FIG. 3 provides a block diagram illustration of a first exemplary wireless device, in this case a handset type mobile station such as station 13a of FIGS. 1 and 2. Although the wireless device 13a may be a smart-phone or may be incorporated into another device, such as a personal digital assistant (PDA) or the like, for discussion purposes, the illustration shows the wireless device 13a in the form of a handset. The handset embodiment of the wireless device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless voice communications through network 15 and possibly voice over packet (Internet Protocol) communications if supported by the station 13a and the data services through the network 15.

For digital wireless communications, the handset 13a also includes at least one digital transceiver (XCVR) 108. Today, the handset 13a would be configured for digital wireless communications using one or more of the common network technology types. For example, the handset 13a may be capable of utilizing either or both of CDMA (IS-95, 1XRTT or EV-DO) technologies and 3GPP (LTE/GSM/UMTS) technologies. The same or a different transceiver may support packet communications for data and/or voice via a wireless local area network technology such as WiFi. For that purpose, the transceiver (XCVR) 108 could be a multimode transceiver, or the mobile station 13a may include two or more transceivers each of which supports a subset of the various technologies or modes. The concepts discussed here encompass embodiments of the station 11 utilizing any digital transceivers that conform to current or future developed digital wireless communication standards. The transceiver 108 provides two-way wireless communication of information, such as vocoded speech samples and/or digital message information, in accordance with the technology of the network 15 although it may also be compatible with one or more public networks 19.

In the example, the transceiver 108 is configured for RF communication in accord with a digital wireless protocol, such as the current CDMA and 3GPP protocols. The communications via the transceiver 108 allow normal operation, when a user has successfully completed authentication, that is to say when the device is at a location of permitted operation and the user has entered a username and password matching a valid user credential. The communications via the transceiver 108 may also allow the mobile station 13a to automatically report that the device is not within a permitted location of operation to appropriate enterprise personnel or systems, e.g. when a user takes the device out of the secure location 11.

The station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. Various combinations of the keypad 120, display 118, microphone 102 and speaker 104 may be used as the physical input and output elements of a graphical user interface (GUI), for multimedia (e.g., audio and/or video) communications. Of course other user interface elements may be used, such as a stylus and touch sensitive display screen, as in a PDA or smart phone.

Of note for our discussion, the display and speaker provide outputs to the device user, and the keypad enables user inputs, for various items related to the authentication technique. For example, the prompt for username and password may be displayed and/or provided as or with an audible output, and the keypad and/or microphone allow user input of the necessary credential information. Warnings, such as that the device is outside its permitted area of operation and therefore not accessible by the user may be provided as visual warnings on the display and/or as audible warnings via the speaker. If the mobile station runs location based service applications, the display 118 may provide other information regarding the determined location and/or surrounding areas, e.g. LAT/LON data, map displays, turn-by-turn directions, etc.

In the example, a microprocessor 112 serves as a programmable controller or processor for the mobile device 13a, in that it controls all operations of the device 13a in accord with programming that it executes, for all normal operations, and for operations involved in the location based authentication procedure under consideration here. In the example, the wireless device 13a includes flash type program memory 114, for storage of various "software" or "firmware" program routines and mobile configuration settings, such as mobile telephone number (MTN or MDN), etc. The wireless device 13a may also include a non-volatile random access memory (RAM) 116 for a working data processing memory. The RAM, for example, may store coordinates or other geographic information identifying one or more locations at which the user is permitted to operate the mobile station 13a and/or a valid user's credential. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and mobile messaging service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

For position determination and associated location based services such as navigational assistance and the authentication procedure under discussion here, the mobile station 13a also includes a GPS receiver 121. The GPS receiver 121 may share the same antenna 110 used by the digital wireless transceiver 108, or there may be a separate additional antenna for the GPS receiver 121. Under control of the microprocessor 112, the GPS receiver 121 receives and processes signals from one or more satellites of the constellation of GPS satellites 25. From its processing, the GPS receiver 121 supplies GPS data to the microprocessor 112, such as pseudorange measurements and associated PN codes for measured satellite signals. Associated computations may be performed in the microprocessor 112 or by a processor or the like included in the GPS receiver 121.

If the receiver 121 or the combination of the receiver and the microprocessor 112 are configured to provide a fully functional GPS position determination device, the station 13*a* could process the pseudorange measurements, absolute times of transmission of the GPS signals, and the satellite position data to compute the station's latitude and longitude. If GIS capability is included, the device could turn the coordinates into other types of location based information, such as street address. However, because of size/space/cost constraints on the design of the handset type mobile stations 13*a*, the GPS receiver 121 in the mobile station 13*a* may have only a reception capability, not the full GPS processing capability to resolve position from signals received from the satellites 25. If the station 13*a* does not have full GPS resolution capability on board, the device may communicate via a network with a network element to process the pseudorange measurements to determine the actual position fix for the device location.

As outlined above, the mobile station 13*a* includes a processor, and programming stored in the flash memory 114 configures the processor so that the mobile device is capable of performing various desired functions, including in this case the functions involved in the user authentication based on geographic location and user credential. As shown by way of an example, the executable programming stored in the flash memory 114 also includes a location program 122 and an authentication program 124. The location program could be a standard program for allowing the mobile device 13*a* to use GPS measurements or the like to determine location of the mobile device. The authentication program 124 controls the user authentication procedures, and in accord with the discussion here, that program includes a geographic location component or module 126. The programs 124, 126 enable the microprocessor 112 to call the location program 122 when needed to obtain current location of the mobile device 13*a*, in this case, to use the location as part of authentication procedures. As a result, the program 124 configures the mobile device 13*a* to implement steps likes steps S2 to S4*b* of FIG. 2, once the program is loaded and the associated permitted location information has been stored in the device (to configure the device as done in step S1 of FIG. 2). Under control of the programming, the mobile device 13*a* may use its transceiver to send alert messages to the enterprise when the device 13*a* is outside of its permitted location(s) of operation and may allow the enterprise to change the profile and/or to permit a temporary location override.

As noted above, the authentication based on geographic location and user credential may be implemented in any of a variety of different types of mobile devices. By way of another example, FIG. 4 shows a portable personal computer such as PC 13*c* of FIG. 1, in simplified functional block diagram form.

The exemplary PC contains a central processing unit (CPU) 152, various memories and storage devices and an interconnect bus 151. The CPU 152 may contain a single microprocessor, or it may contain a plurality of microprocessors for configuring the CPU 152 as a multi-processor system. The memories include a main memory, such as a dynamic random access memory (DRAM) 153 and high-speed cache memory (not shown), as well as a read only memory (ROM) 154, such as a PROM, an EPROM, a FLASH-EPROM, or the like. The system 13*c* also includes mass storage devices such as various disk drives, tape drives, etc., exemplified by the hard disk drive 155. In operation, the main memory stores at least portions of instructions and data loaded from mass storage 155, for execution by the CPU 152.

The mass storage may include one or more magnetic disk or tape drives or optical disk drives, for storing data and instructions for use by CPU 152. For a PC, for example, at least one mass storage system 155 in the form of a disk drive, stores the operating system and application software as well as data, such as received messages and documents. The mass storage 155 within the computer system 13*c* may also include one or more drives for various portable media, such as a floppy disk, a disc read only memory (CD-ROM, DVD-ROM, etc.), or an integrated circuit non-volatile memory adapter (i.e. PC-MCIA adapter) to input and output data and code to and from the computer system 13*c*.

The system 13*c* also includes one or more input/output interfaces for communications, shown by way of example as a wireless transceiver 159, serving as an interface for data communications via the networks of FIG. 1. The transceiver 159 may be a WiFi interface card or may be a digital cellular network transceiver similar to the transceiver 108 in the mobile station 13*a*. The transceiver allows the mobile device 13*c* to communicate much like the device 13*a*, although the applications for the device 13*c* may involve more data communications including some that utilize higher data rates. Of note for purposes of our discussion, the transceiver may also support transmissions of alert messages to the enterprise when the device 13*c* is outside of its permitted location(s) of operation and may allow the enterprise to change the profile and/or to permit a temporary location override.

The computer system 13*c* may further include appropriate input/output drivers 156 for interconnection with a display 157 and a keyboard 158 of the user interface. The user input elements of the interface may include other input devices, such as a joystick, trackball or the exemplary touch (T) pad 161 shown in the drawing for cursor control and selection of items shown on the display. Other PC type devices may include touch screen display panels. Although not shown, the PC type system typically would include a variety of input/output ports, such as USB ports, a port for connection to a printer, or the like. Another component that may be included is a camera.

The display and user inputs form a user interface for the PC type device 13*c*, for its various applications/functions. Of note for our discussion, the user interface provides the prompt for credential input from the user and accepts user input of a user name and a password for the user authentication. These elements also enable the device 13*c* to provide a warning if the device is outside of the location(s) designated for its permissible operations.

For the location determination, including that for the authentication procedure, the portable PC 13*c* includes a GPS receiver (RCVR) 163, the same as or similar to the receiver 161 in the mobile handset type device 13*a*. The GPS receiver 163 may share the same antenna used by the digital wireless transceiver 159, or there may be a separate additional antenna for the GPS receiver 163. Under control of the CPU 152, the GPS receiver 163 receives and processes signals from one or more satellites of the constellation of GPS satellites 25. From its processing, the GPS receiver 163 supplies GPS data to the CPU 152, such as pseudorange measurements and associated PN codes for measured satellite signals. Associated computations may be performed in the CPU 152 or by a processor or the like included in the GPS receiver 163. The processing power and data storage capacity of the PC will often be much larger than those in the mobile telephone station, therefore the mobile device 13c is more likely to have the full capacity to determine the final position fix within the device with little or no network assistance and more likely to have associated GIS capabilities. The programming therefore will likely allow the device 13c to offer a variety of other location based features, such as map and direction type applications, in addition to the location based component of authentication and access control.

As noted earlier, the mass storage and main memory handle programming of the device 13c for execution by the CPU 152. Of note, the programming in the disk drive 155 will include a location program 165 and an authentication program 167 similar to the programs 122, 124 discussed earlier. The location program could be a standard program for allowing the PC type mobile device 13c to use GPS measurements or the like to determine location of the device. The authentication program 167 controls the user authentication procedures, and in accord with the discussion here, that program includes a geographic location component or module 169. The programs 167, 169 enable the CPU 152 to call the location program 165 when needed to obtain current location of the mobile device 13c, in this case, to use location as part of authentication procedures. As a result, the program 167 configures the mobile device 13c to implement steps likes steps S2 to S4b of FIG. 2, once the program is loaded and the associated permitted location information has been stored in the device (to configure the device as done in step S1 of FIG. 2).

As shown by the above discussion, the functions relating to user authentication based on geographic location and user credential may be implemented on any of various types of programmable mobile devices, in accordance with the methodology of FIG. 2. Two exemplary types of mobile devices have been discussed above with respect to FIGS. 3 and 4.

Hence, aspects of the technique for user authentication based on geographic location, as outlined above, may be embodied in programming for any of the various types of mobile devices. Program aspects of the technology may be thought of as "products" or "articles of manufacture" typically in the form of executable code and/or associated data that is carried on or embodied in a type of machine readable medium. "Storage" type media include any or all of the tangible, non-transitory memory of the mobile devices, computers for downloading programming to such devices, other processors, or the like, or associated modules thereof, such as various semiconductor memories, tape drives, disk drives and the like, which may provide storage at any time for the programming and/or associated profile data. All or portions of the programming and data may at times be communicated through the Internet or various other telecommunication networks. Such communications, for example, may enable loading of the programming and data from a server or other computer into a mobile device, for example, as part of the initial configuration of a mobile device or as part of an upgrade to a more secure authentication strategy. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible non-transitory storage medium, a carrier wave medium or a physical transmission medium. Non-volatile tangible non-transitory storage media include, for example, optical or magnetic disks, such as any of the storage devices in any of the mobile devices, various computers or the like, as shown in the drawings. Volatile tangible non-transitory storage media include dynamic memory, such as main memory of a computer platform or mobile device. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of machine-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, EPROM and EEPROM, a Flash-EPROM, any other memory chip or cartridge, a carrier wave transporting data or instructions, cables or links transporting such a carrier wave, or any other medium from which a computer or other machine can read programming code and/or data. Many of these forms of computer or machine readable media may be involved in carrying one or more sequences of one or more instructions to a processor for execution.

Those skilled in the art will recognize that the authentication and access/operation control discussed herein is amenable to a variety of modifications and/or may be applied in a variety of different ways. For example, the discussion focused on an enterprise application in which operation is permitted by the enterprise for mobile devices of enterprise personnel when located within an enterprise approved location. Operation was blocked when the device was not at a permitted location of operation. In that context, the permitted area of operation was effectively a closed boundary surrounding the permitted area of operation. However, for other applications, the area of permitted operation may be defined in a different way. For example, in a family type enterprise the parents might decide to permit a child's mobile device to operate at locations outside a defined area, e.g. when outside the boundaries of a school. Stated another way, the permitted location of operation is outside the defined area and the device is at a location where it is not permitted to operate when the mobile device is located in the school. The associated user credential requirement would also reduce the possibility of others borrowing/stealing the child's device for their own operation and possibly running up the family's bill on their mobile service account.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of authenticating a user to operate a mobile device, comprising steps of:
   (a) determining a geographic location of the mobile device;
   (b) comparing the determined geographic location to information defining a location of permitted operation of the mobile device which is bounded, stored in the mobile device, to determine whether or not the mobile device is at the location of permitted operation, wherein the information defining the location of permitted operation of the mobile device includes at least one time period of permitted operation associated with the location of permitted operation of the mobile device;

(c) permitting user access to the mobile device, only upon determining:
1) that the mobile device is within the location of permitted operation,
2) a time during which the mobile device is in the location of permitted operation is within the associated time period of permitted operation, and
3) that the mobile device is not at a location at which operation is not permitted regardless of the associated time period of permitted operation, wherein the step of permitting user access to the mobile device includes:
generating a prompt to the user for entering credential information into the mobile device;
receiving input of credential information into the mobile device from the user; and
permitting user access to the mobile device only upon a match of the input credential information to credential information of a valid user, stored in the mobile device; and (d) blocking user access to the mobile device, upon determining that the mobile device is at a location at which operation is not permitted; and (e) blocking user access to the mobile device upon determining that the mobile device is at the location of permitted operation at a time that is not within the time period of permitted operation associated with the location of permitted operation of the mobile device, even if user access to the mobile device is located at the location of permitted operation at the time period wherein step (d) comprises generating a warning for the user that the mobile device is not at the location of permitted operation, and restricting generating the prompt to the user for entering credential information.

2. The method of claim 1, wherein step (d) comprises interrupting any operation of the mobile device by the user started prior to the determination that the mobile device is not at the location of permitted operation.

3. The method of claim 1, further comprising sending a message from the mobile device to an enterprise associated with the mobile device advising the enterprise that the mobile device is not at the location of permitted operation.

4. The method of claim 1, further comprising:
receiving programming and/or information defining a location of permitted operation of the mobile device; and
storing the received programming and/or information in the mobile device, to configure the mobile device to perform steps (a) through (d).

5. The method of claim 4, wherein the receiving step comprises receiving the programming and/or information in the mobile device via a wireless network communication.

6. A mobile device, comprising:
a user interface for outputting information to a user of the mobile device and for receiving inputs from the user of the mobile device;
a programmable processor coupled to the user interface;
at least one storage device accessible by the processor, for storing programming for execution by the processor and data for processing by the processor, wherein at least some of the programming configures the processor to enable the mobile device to perform functions for authenticating the user to operate the mobile device, comprising functions to:
(a) determine a geographic location of the mobile device;
(b) compare the determined geographic location to information defining a location of permitted operation of the mobile device which is bounded, stored in the at least one storage device, to determine whether or not the mobile device is at the location of permitted operation, wherein the information defining the location of permitted operation of the mobile device includes at least one time period of permitted operation associated with the location of permitted operation of the mobile device;

(c) permit user access to the mobile device, only upon determining:
1) that the mobile device is within the location of permitted operation,
2) a time during which the mobile device is in the location of permitted operation is within the associated time period of permitted operation, and
3) that the mobile device is not at the location of permitted operation, regardless of the associated time period of permitted operation, wherein the function of permitting user access to the mobile device includes functions to:
generate a prompt via the user interface to the user prompting the user to enter credential information;
receive input of credential information from the user via the user interface; and
permit user access to the mobile device only upon a match of the input credential information to credential information of a valid user, stored in the at least one storage device;

(d) block user access to the mobile device, upon determining that the mobile device is at a location at which operation is not permitted; and (e) block user access to the mobile device upon determining that the mobile device is at the location of permitted operation at a time that is not within the one time period of permitted operation associated with the location of permitted operation of the mobile device, even if user access to the mobile device is permitted at the location of permitted operation during the one time period wherein the function (d) comprises generating a warning for the user that the mobile device is not at the location of permitted operation, via the user interface, and restricting generating the prompt to the user prompting the user to enter credential information.

7. The mobile device of claim 6, wherein the function (d) comprises interrupting any operation of the mobile device by the user started prior to the determination that the mobile device is not at the location of permitted operation.

8. The mobile device of claim 6, further comprising:
a transceiver for communication via a wireless network, controlled by the processor,
wherein at least some of the programming configures the processor to enable the mobile device to perform further functions to:
receive programming and/or information defining a location of permitted operation of the mobile device; and
store the received programming and/or information in the at least one storage device, to configure the mobile device to perform functions (a) through (d).

9. An article of manufacture, comprising:
a non-transitory computer readable medium; and programming stored on the medium for execution by a programmable processor of a mobile device, wherein execution of the programming configures the processor to enable the mobile device to perform functions for authenticating a user to operate the mobile device, comprising functions to:

(a) determine a geographic location of the mobile device;
(b) compare the determined geographic location to information defining the location of permitted operation of the mobile device that is bounded, stored in at least one storage of the mobile device, to determine whether or not the mobile device is at the location of permitted operation, wherein the information defining the location of permitted operation of the mobile device includes at least one time period of permitted operation associated with the location of permitted operation of the mobile device;

(c) permit user access to the mobile device, only upon determining:
  1) that the mobile device is within the location of permitted operation,
  2) a time during which the mobile device is in the location of permitted operation is within the associated time period of permitted operation, and
  3) that the mobile device is not at a location at which operation is not permitted, regardless of the associated time period of permitted operation, wherein the function of permitting user access to the mobile device includes functions to:
  generate a prompt via a user interface of the mobile device to the user prompting the user to enter credential information;
  receive input of credential information from the user via the user interface; and
  permit user access to the mobile device only upon a match of the input credential information to credential information of a valid user, stored in the at least one storage;

(d) block user access to the mobile device, upon determining that the mobile device is at a location at which operation is not permitted, and (e) block user access to the mobile device upon determining that the mobile device is at the location of permitted operation at a time that is not within the one time period of permitted operation associated with the location of permitted operation of the mobile device, even if user access to the mobile device is permitted at the location of permitted operation during the one time period wherein the function (d) comprises generating a warning for the user that the mobile device is not at the location of permitted operation, via the user interface, and restricting generating the prompt to the user prompting the user to enter credential information.

10. The article of claim 9, wherein the function (d) comprises interrupting any operation of the mobile device by the user started prior to the determination that the mobile device is not at the location of permitted operation.

11. The article of claim 9, wherein at least some of the programming configures the processor to enable the mobile device to perform further functions to:
  receive programming and/or information defining the location of permitted operation of the mobile device, via a transceiver of the mobile device for communication via a wireless network; and
  store the received programming and/or information in the at least one storage device, to configure the mobile device to perform functions (a) through (d).

* * * * *